Oct. 25, 1966  R. C. KAYSER ETAL  3,280,759
TRANSFER MECHANISM FOR CONVEYING APPARATUS
Filed May 17, 1965  3 Sheets-Sheet 1
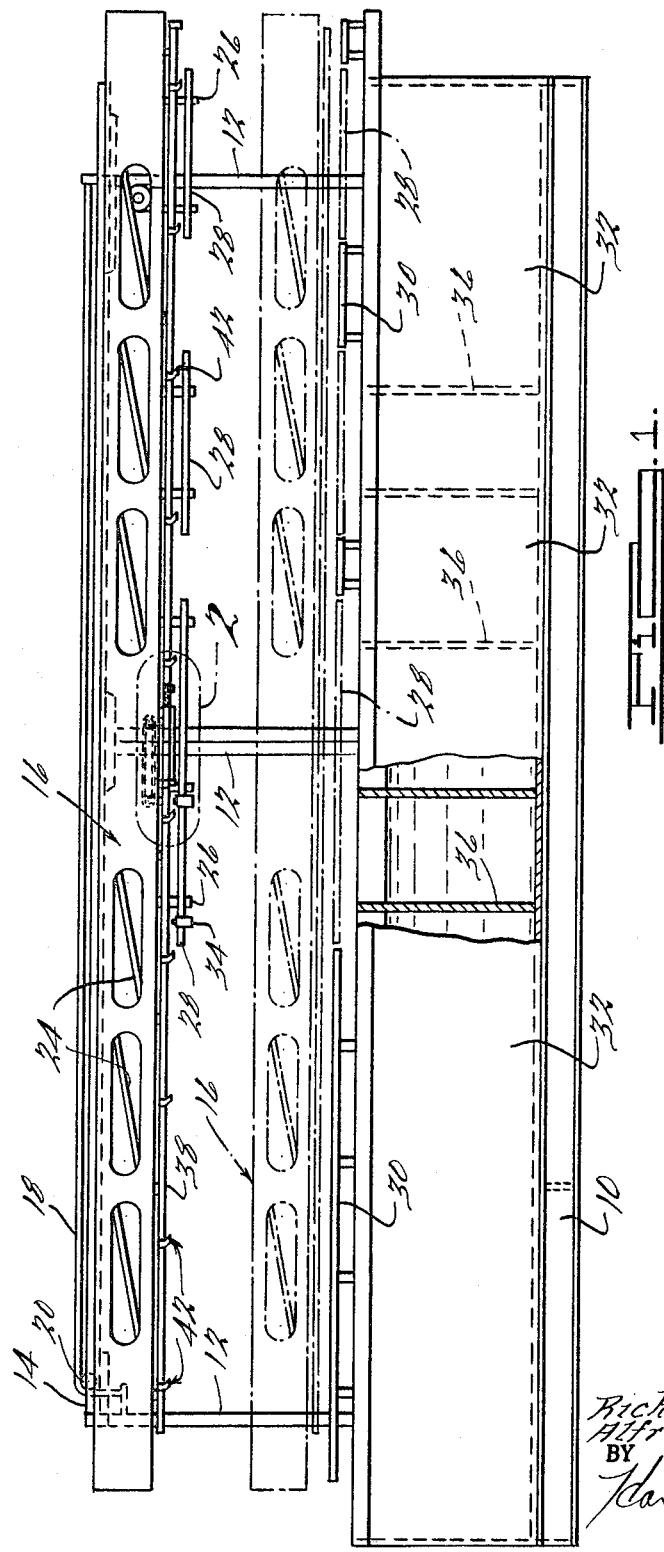
INVENTORS.
Richard C. Kayser.
Alfred J. Stancato.
BY
Harness, Dickey & Pierce
ATTORNEYS.

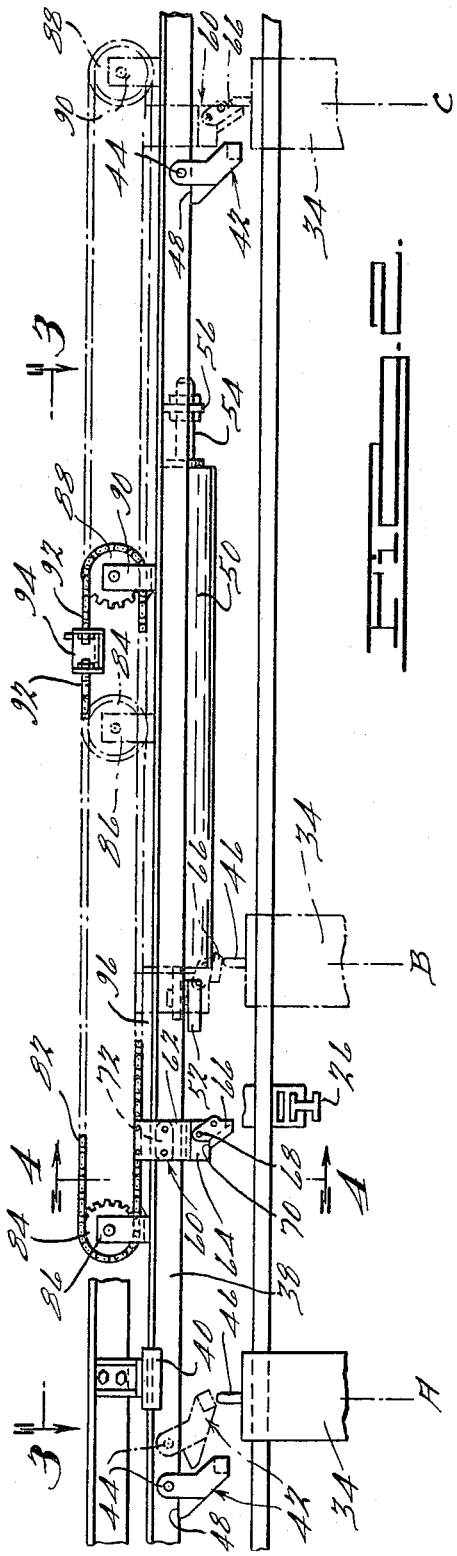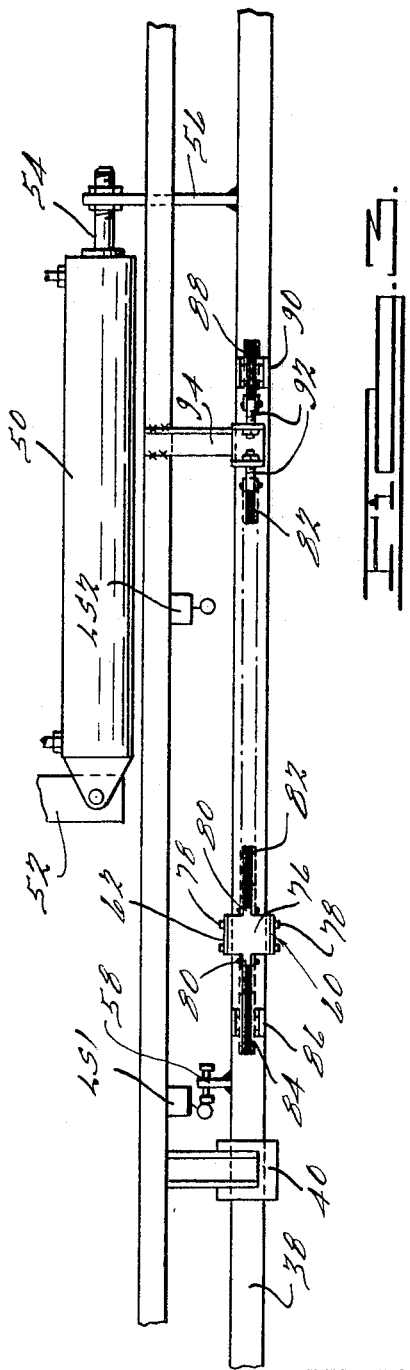

Oct. 25, 1966 R. C. KAYSER ETAL 3,280,759
TRANSFER MECHANISM FOR CONVEYING APPARATUS
Filed May 17, 1965 3 Sheets-Sheet 3
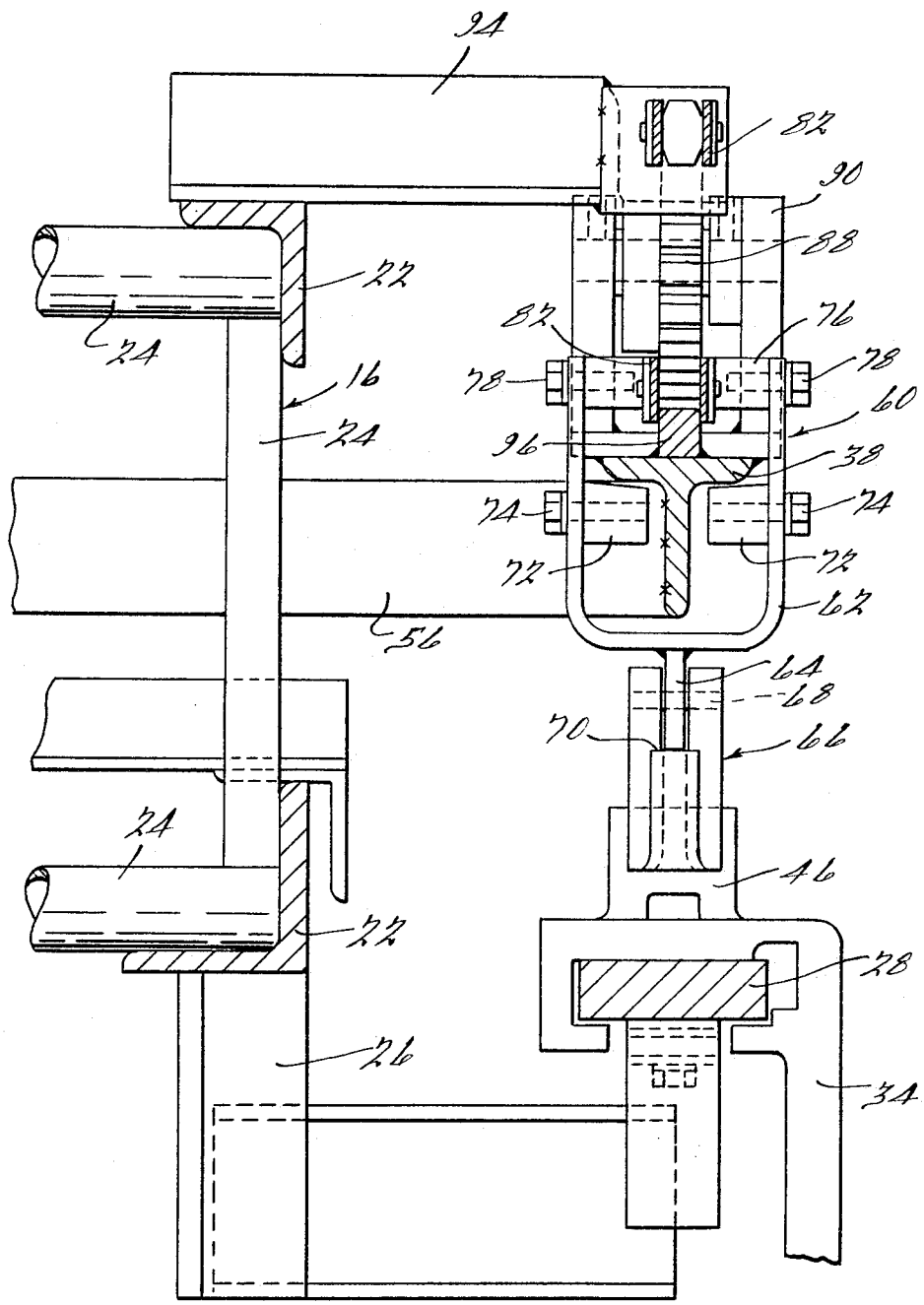
INVENTORS.
Richard C. Kayser.
Alfred J. Stancato
BY
Carnes, Dickey & Pierce
ATTORNEYS.

United States Patent Office 3,280,759
Patented Oct. 25, 1966

3,280,759
TRANSFER MECHANISM FOR CONVEYING APPARATUS
Richard C. Kayser, Mount Clemens, and Alfred J. Stancato, Taylor Township, Mich., assignors to The Udylite Corporation, Warren, Mich., a corporation of Delaware
Filed May 17, 1965, Ser. No. 456,147
4 Claims. (Cl. 104—162)

The present invention broadly relates to conveying machines and more particularly to an improved transfer mechanism for conveying machines of the type suitable for automatically transferring workpieces through a series of treating stations such as a series of electroplating stations or the like. More specifically, the present invention is directed to an improved reciprocable pusher mechanism including at least one auxiliary pusher thereon which is movable through a distance different than that of the remaining pushers on the transfer mechanism providing therewith selected variations in the distance of advancement of the workpieces along a suitable work supporting rail.

The improved reciprocable transfer mechanism comprising the present invention, is particularly applicable to but not necessarily limited to conveying machines of the general type disclosed in United States Patent 2,912,094 granted November 10, 1959, for Plating Apparatus, which is assigned to the same assigned as the present invention. In conveying machines of the type disclosed in the aformentioned United States patent, a plurality of work carriers having workpieces supported or suspended therefrom, are movably mounted on a suitable rail and are intermittently advanced therealong through a series of treating stations. Machines of this general type preferably are constructed including two straight side rail sections connected at one or both of their ends by arcuate turnaround sections providing therewith a machine of the so-called return type. Alternatively, and equally applicable to the present invention, machines of the so-called straight line type can be employed wherein workpieces are loaded at one end of the machine and are unloaded from the opposite end thereof after the workpieces have completed the intervening treating sequence. In many instances, it is desirable to periodically elevate the workpieces in order that they can be transferred above intervening obstructions such as tank partitions, for example, in which case the supporting rail is sectionalized including fixed sections disposed in a lowered position as well as movable sections which are movable to and from a lowered position in which they are disposed in end-to-end alignment with the fixed rail sections and a raised clearance position in which the workpieces can be readily advanced without encountering any interference.

In either event, the work carriers including the workpieces thereon, are intermittently advanced in succession from the load station to each successive treating station by a reciprocable transfer mechanism. It is frequently desirable and in many instances necessary, to provide for variations in the distance of travel of the work carriers between certain stations. The maximum travel or advancement of a work carrier is limited by the total reciprocating movement of the reciprocable transfer mechanism. In those instances when a greater distance of travel is necessitated, it has heretofore been proposed to install separate advancing mechanisms which operate in synchronization with the principal transfer mechanism for achieving variations in the distance of travel of individual work carriers. Such auxiliary transfer mechanisms including independent drive means substantially increase the cost and complexity of a conveying machine and, moreover, require control means to assure automatic synchronous operation thereof in relation to the principal transfer mechanism. Alternatively, it has been suggested to increase the reciprocable transfer stroke of the principal pusher mechanism to that of the maximum distance of travel required along the treating stations, but this necessitates a greater optimum spacing between treating stations along the remaining portions of the machine which results in a substantial increase in machine size and a reduction in the efficiency of the utilization of plant space.

It is accordingly, a principal object of the present invention to provide an improved reciprocable transfer or pusher mechanism including at least one auxiliary pusher thereon which is operable in response to the reciprocating travel of the principal transfer mechanism to effect advancement of a work carrier along a portion of the supporting rail a distance selectively different from that provided by the pushers on the principal transfer mechanism.

Another object of the present invention is to provide an improved reciprocable pusher mechanism incorporating an auxiliary pusher thereon which is movable through an interval different from that of the principal transfer mechanism and which movement is mechanically linked and synchronized with the reciprocating movement of the principal pusher mechanism.

Still another object of the present invention is to provide an improved pusher mechanism incorporating an auxiliary pusher thereon providing selected variations in the transfer distance of work carriers along a supporting rail achieving thereby a substantial increase in the flexibility and versatility of the conveying machine while concurrently overcoming the problems and disadvantages of conveying machines including auxiliary transfer mechanisms of similar type heretofore known.

A further object of the present invention is to provide an improved transfer mechanism for a conveying machine including an auxiliary pusher mechanism mechanically coordinated therewith which is of simple design, durable operation, economical construction, and versatile operation.

The foregoing and other objects and advantages of the present invention are achieved by providing a conveying machine including a frame having a rail thereon for movably supporting a series of work carriers and incorporating a reciprocable pusher member extending longitudinally of at least a portion of the rail on which a plurality of pushers are mounted at spaced intervals for engaging and intermittently advancing the work carriers along the rail in response to the movement of the pusher member to and from a retracted position and a projected or advanced position. The principal pusher mechanism includes an auxiliary pusher which is movably and guidably mounted on the pusher member for relative reciprocation therealong and is movable by linkage means drivingly coupled to said principal pusher mechanism effecting automatic coordinated reciprocating travel thereof relative to said pusher member through a distance different than the pusher member and in response to the reciprocating movement thereof.

Other objects and advantages of the present invention will become apparent upon a reading of the following description taken in conjunction with the accompanying drawings, wherein:

FIGURE 1 is a side elevational view of a typical conveying machine to which the improved transfer mechanism comprising the present invention is applicable;

FIGURE 2 is an enlarged fragmentary side elevational view of the auxiliary pusher mechanism employed in the machine as shown in FIGURE 1, and encompassing the area within the dotted circle indicated at 2 in FIG. 1;

FIGURE 3 is a fragmentary plan view of the auxiliary pusher mechanism as viewed along the arrows indicated at 3 in FIGURE 2, and FIGURE 4 is a transverse vertical sectional view through the auxiliary and principal pusher mechanism as shown in FIGURE 2 and taken along the lines 4—4 thereof.

Referring now in detail to the drawings and as may be best seen in FIGURE 1, a conveying machine exemplary of the type to which the present invention is applicable comprises a framework including base beams 10 which form a platform on which a series of vertical columns 12 are securely mounted and are interconnected at their upper ends by a longitudinal beam indicated at 14. An elevator chassis 16 is movably and guidably supported on the upright columns 12 for vertical movement to and from a raised position as shown in solid lines in FIGURE 1 to a lowered position as shown in phantom. Movement of the elevator chassis 16 between the raised and lowered positions is achieved by suitable drive means (not shown) including a cable 18 and a pulley 20 which are connected to the drive means and suitable counterweights.

The elevator chassis 16, as best seen in FIGURES 1 and 4, is constructed of a framework including longitudinal angle irons 22 interconnected to tubular frame members 24 forming a substantially rigid framework. The elevator chassis extends for the entire length of the conveying machine and a series of outriggers or support members 26 are affixed at longitudinally spaced increments to the lower angle iron member 22, as shown in FIGURE 4 to which movable rail sections 28 are affixed. The movable rail sections 28 move to and from the raised and lowered position in response to the ascending and descending travel of the elevator chassis and when in the lowered position are disposed in end-to-end alignment with a series of fixed rail sections 30 affixed to the machine frame at a position above a series of treating receptacles or tanks 32. When the elevator chassis is in the fully lowered position, the movable rail sections 28, as shown in phantom in FIGURE 1, in combination with the fixed rail sections 30, form a continuous rail extending around the machine along which a series of work carriers such as the work carriers 34 are intermittently advanced.

As best seen in FIGURE 1, the movable rail sections 28 are located along these portions of the machine at which the work carriers and the work racks suspended therefrom must be elevated in order to permit advancement of the work carrier above intervening tank partitions 36 which separate adjoining treating receptacles. It will be understood that while the invention will be described in combination with the exemplary conveying machine as illustrated in FIGURE 1, which is of the so-called return type including a movable elevator chassis, the improved reciprocable transfer mechanism is equally applicable to conveying apparatus of other types having a rail for movably supporting a series of work carriers.

In accordance with the arrangement as hereinbefore described, the work carriers 34 are intermittently advanced along the movable rail sections 28 and the fixed rail sections 30 by means of a reciprocable transfer mechanism. In the exemplary conveying machine shown, the reciprocable transfer mechanism is carried by the elevator chassis and accordingly is operative when the elevator chassis is in the raised position to advance those work carriers which are supported on the movable rail sections and when in the lowered position it is operative to move all of the work carriers on the movable as well as on the fixed rail sections. The operation of the reciprocable transfer mechanism is coordinated with the lifting and lowering movement of the elevator chassis through a central control circuit in a manner well known in the art, and to which reference to United States Patent No. 2,912,094 is made for further details as to the structural features of the conveying machine apart from the reciprocable transfer mechanism as hereinafter described in detail.

The transfer mechanism comprises a longitudinally extending pusher member or pusher bar 38 which is slidably supported on the elevator chassis by means of a series of guide shoes 40, as best seen in FIGURES 2 and 3, which are affixed to and extend outwardly of the elevator chassis. In the exemplary embodiment shown, and as best seen in FIGURE 4, the pusher bar 38 is of a T-shaped cross section wherein the horizontal web thereof is disposed in sliding engagement in the guide shoe 40. A series of pushers 42, as best seen in FIGURES 1 and 2, are pivotally connected by means of a pivot pin 44, to the depending web of the pusher bar 38 and extend downwardly therefrom to a position so as to engage a projection 46 extending upwardly of the body of the work carrier 34. Each of the pushers 42 include a stop flange 48 which is adapted to engage the lower edge of the depending web of the pusher bar as shown in FIGURE 2, preventing a pivoting thereof in a clockwise direction during the advancing movement of the pusher bar. During the retracting movement of the pusher bar from a fully advanced position, the pushers 42 are operative to pivot in a counterclockwise direction to a position as shown in phantom in FIGURE 2 permitting retraction of the pusher to a position rearwardly of the work carrier preparatory to the next advancing stroke.

Reciprocation of the pusher bar 38 and the pushers 42 thereon to and from a retracted position, as shown in solid lines in FIGURE 2, to an advanced position is achieved by suitable drive means such as a double-acting fluid actuated cylinder 50 mounted at its blank end, as shown in FIGURE 3, to a bracket 52 of the elevator chassis. A piston rod 54 of the cylinder 50 is connected to an arm 56 affixed to the pusher bar for effecting reciprocation thereof in response to the outward and inward travel of the piston rod. The length of reciprocating travel of the pusher bar is controlled either by the selection of a cylinder 50 of a prescribed stroke or, alternatively, by means of a retracted position limit switch LS1, as shown in FIGURE 3, and a projected position limit switch LS2, which are adapted to be tripped by an actuator 58 on the pusher bar when the pusher bar attains the fully retracted and fully projected position, respectively. The tripping of limit switches LS1 and LS2 is also operative to signal the central control circuit of the conveying machine of the completion of the reciprocating movement of the pusher bar whereupon the next operating step, such as the lifting or lowering of the elevator chassis, can be achieved in appropriate coordinated sequence.

In accordance with this arrangement, a work carrier 34, as shown in solid lines in FIGURE 2, is advanced from a position such as station A at the left hand side of FIGURE 2 to the position at station B as shown in phantom immediately to the right thereof in response to the projecting travel of the pusher bar. The next advance of the work carrier 34 from the position indicated at B in FIGURE 2 to the position indicated at C is achieved by the auxiliary pusher mechanism which provides an advancement of the work carrier substantially in excess of the reciprocating travel of the pusher bar. The increased length of advancement of the work carrier is frequently necessitated along selected portions of the conveying machine due to desired variations in the treating sequence to which the workpieces are to be subjected or due to the location of mechanical obstructions such as ancillary equipment required at the treating station for providing the appropriate treating treatment.

The construction and operation of the auxiliary pusher mechanism will now be described with particular reference to FIGURES 2–4. The auxiliary pusher mechanism, as shown in the drawings, includes a pusher assembly 60 comprising a U-shaped bracket 62 having a web 64 affixed to and depending from the lower bight portion thereof. An auxiliary pusher 66 is pivotally mounted by means of a pivot pin 68 to the web 64 for pivoting movement in a manner similar to the principal pushers 42. The auxiliary pusher 66 is similarly provided with a stop flange 70 for engaging the lower edge of the web 64 to prevent pivoting thereof in a clockwise direction beyond the position as shown in solid lines in FIGURE 2. During the retracting movement of the auxiliary pusher 66, contact thereof with a projection 46 on the upper end of a work carrier 34 is effective to cause a pivoting movement of the auxiliary pusher in a counterclockwise direction to a position as shown in phantom in FIGURE 2 above the work carrier positioned at station "B" enabling retraction of the auxiliary pusher to a position therebehind preparatory to the next advancing movement.

The pusher assembly 60 is movably mounted and guided along the pusher bar 38 as is best seen in FIGURE 4 by means of a pair of opposing transversely spaced guides 72 affixed to the intermediate portions of the upstanding legs of the U-shaped bracket 62 by means of screws 74. The guides 72 are adapted to be disposed in sliding engagement along the undersurface of the horizontal web of the T-shaped pusher bar 38, as best seen in FIGURE 4. The upper end of the U-shaped bracket 62 is secured to a chain connector plate 76 by means of screws 78. Each of the longitudinally spaced sides of the chain connector plate 76, as best seen in FIGURE 3, is formed with a longitudinally projecting ear 80, to which the terminal links of a roller chain 82 are pivotally secured.

The roller chain 82 is arranged such that the lower flight thereof, as best seen in FIGURES 2 and 3, extends longitudinally of the pusher bar 38 and is trained around a sprocket 84 rotatably mounted on a bracket 86 at one end and a sprocket 88 rotatably mounted on a bracket 90 at the opposite end. The brackets 86 and 90 are of a U-shaped configuration and are securely affixed to the upper surface of the horizontal web of the pusher bar and are reciprocable with and in response to the reciprocating travel of the pusher bar. The upper flight of the roller chain 82 is formed with a gap the terminal ends of which are connected to threaded screws 92 which in turn are secured to a bracket 94 affixed to and projecting laterally of the elevator chassis 16. The threaded screws 92 permit adjustment of the tension of the roller chain 82.

The lower flight of the roller chain 82, as may be best seen in FIGURES 2 and 4, is disposed in sliding guided relationship on a guide bar 96 extending centrally of and securely affixed to the upper surface of the horizontal web of the pusher bar 38. The guide bar 96 extends for substantially the entire distance between the sprockets 84 and 88 and is of a width so as to engage the inner surfaces of the plates forming each link of the roller chain, as shown in FIGURE 4, providing therewith longitudinal support and guidance of the lower flight of the chain as well as the pusher assembly 60 supported thereon. It will be understood that alternative linkage devices including flexible belts and cables can be employed in lieu of the roller chain 82 as exemplarily illustrated in the drawings.

The operation of the principal and auxiliary pusher mechanism will now be described, with particular reference to the arrangement illustrated in FIGURE 2. The principal pusher mechanism and the auxiliary pusher mechanism, as shown in solid lines in FIGURE 2, are disposed in the fully retracted position preparatory to the next advancing movement. In that position, the pivotally mounted pusher 42 of the principal pusher mechanism is disposed rearwardly of a work carrier 34 disposed at station "A," while the auxiliary pusher 66 is disposed rearwardly of a work carrier disposed at station "B," while a second principal pusher 42 is disposed rearwardly of a work carrier 34 at station "C." The transfer movement of the principal and auxiliary transfer mechanisms is initiated in response to the energization of the fluid-actuated cylinder 60, whereupon the piston rod 54 commences its projected travel. The pushers 42 of the principal transfer mechanism engage the projections 46 of the work carriers 34 positioned at stations "A" and "C," respectively, while the auxiliary pusher 66 engages the work carrier 34 disposed at station "B." As the pusher bar moves from the fully retracted to the fully advanced position, an amplification in the travel of the pusher assembly 66 is achieved through the linkage arrangement comprising the sprockets and roller chain, whereupon the pusher assembly 60 slides forwardly in guided relationship along the T-shaped pusher bar 38. At the completion of the advancing movement of the pusher bar as signaled by the tripping of forward limit switch LS2 by the actuator 58 (FIGURE 3), the sprocket 84 is advanced from the position as shown in solid lines in FIGURE 2 to the position as shown in phantom, while the sprocket 88 similarly is moved by the pusher bar to the position as shown in phantom. The roller chain 82 during the advancing movement is held stationary by the bracket 94 affixed to the elevator chassis, but the longitudinal reciprocation of the sprockets 84, 88 effects movement of the chain such that the pusher assembly 60 is moved from the position as shown in solid lines in FIGURE 2 to the position as shown in phantom such that the work carrier at station "B" is advanced to the position as shown in phantom at station "C." In the exemplary arrangement as shown, the distance of advancement of the work carriers by the auxiliary transfer mechanism is approximately twice the length of reciprocating travel of the pusher bar.

At the completion of the projecting travel of the transfer mechanism, the fluid actuated cylinder 50 is again energized effecting a retraction of the piston rod 54 and the pusher bar 38 whereupon the principal pushers 42 and the auxiliary pusher assembly 60 are moved to their retracted positions as shown in solid lines in FIGURE 2. The completion of the retracting movement of the pusher assembly is signaled by the tripping of rearward limit switch LS1 by the actuator 58 (FIGURE 3). During the retracting stroke of the pusher mechanism, the pusher assembly 60 moves toward the left relative to the pusher bar as viewed in FIGURE 2 in response to the clockwise movement of the roller chain 82 about the sprockets 84, 88. When the fully retracted position is attained, the principal pushers 42 and the auxiliary pusher 66 are again positioned rearwardly of the work carriers at stations A, B and C preparatory to the next advancing movement of the transfer mechanism.

It will be apparent from the foregoing that the arrangement as illustrated can be duplicated at one or more additional locations along the rail sections of the machine to achieve variations in the distance of transfer of the work carriers to provide the desired operating sequence. It will also be understood that additional sprockets 84, 88 can be provided so as to achieve a compound sprocket arrangement providing still further amplification in the travel of the auxiliary pusher assembly relative to the reciprocating travel of the principal pusher bar.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a conveying machine including a frame having a rail thereon for movably supporting work carriers and a pusher member extending longitudinally of at least a portion of the rail and provided with a plurality of pushers disposed at spaced intervals for engaging and intermittently advancing the carriers along the rail in response to movement of the pusher member to and from a retracted position and an advanced position, the improvement comprising auxiliary pusher means for advancing a work carrier along the rail a distance greater than the reciprocating travel of said pusher member, said auxiliary pusher means including an auxiliary pusher movably and guidably mounted on said pusher member for relative reciprocation therealong, and multiplier means on the frame drivingly connected to said pusher member and said auxiliary pusher for effecting coordinated recirprocating movement thereof relative to said pusher member and in the same direction in response to the reciprocating movement of said pusher member.

2. In a conveying machine including a frame having a rail thereon for movably supporting work carriers, and a pusher member extending longitudinally of at least a portion of the rail and provided with a plurality of pushers disposed at fixed spaced intervals therealong for engaging and intermittently advancing the carriers along the rail in response to movement of the pusher member to and from a retracted position and an advance position, the improvement comprising auxiliary pusher means for advancing a work carrier along the rail a distance greater than that provided by the other pushers, said auxiliary pusher means including an auxiliary pusher movably and guidably mounted on said pusher member for relative reciprocation therealong, a first rotatable member and a second rotatable member rotatably mounted on said pusher member in longitudinally spaced relationship, a flexible element trained around said first and said second rotatable element, means for connecting said flexible element to said frame and to said auxiliary pusher, and means for reciprocating said pusher member for effecting a corresponding coordinated reciprocating movement of said auxiliary pusher relative to said pusher member through an increment greater than the reciprocating travel of said pusher member.

3. In a conveying machine including a frame having a rail thereon for movably supporting work carriers, and a pusher member extending longitudinally of at least a portion of the rail and provided with a plurality of pushers disposed at fixed spaced intervals therealong for engaging and intermittently advancing the carriers along the rail in response to movement of the pusher member to and from a retracted position and an advance position, the improvement comprising auxiliary pusher means for advancing a work carrier along the rail a distance greater than that provided by the other pushers, said auxiliary pusher means including an auxiliary pusher movably and guidably mounted on said pusher member for relative reciprocation therealong, a plurality of rotatable members rotatably mounted on said pusher member in longitudinally spaced relationship and reciprocable therewith, a flexible element trained around said rotatable members, means for connecting said flexible element to said frame and to said auxiliary pusher, and means for reciprocating said pusher member effecting a corresponding coordinated reciprocating travel of said auxiliary pusher relative to said pusher member through an increment greater than the reciprocating movement of said pusher member.

4. In a conveying machine including a frame having a rail thereon for movably supporting work carriers, and a pusher member extending longitudinally of at least a portion of the rail and provided with a plurality of pushers disposed at fixed spaced intervals therealong for engaging and intermittently advancing the carriers along the rail in response to movement of the pusher member to and from a retracted position and an advance position, the improvement comprising auxiliary pusher means for advancing a work carrier along the rail a distance greater than that provided by the other pushers, said auxiliary pusher means including an auxiliary pusher movably and guidably mounted on said pusher member for relative reciprocation therealong, a first sprocket and a second sprocket rotatably mounted on said pusher member in longitudinally spaced relationship, a chain trained around said first and second sprocket, means for connecting one flight of said chain to said frame, means for connecting the other flight of said chain to said auxiliary pusher, and means for reciprocating said pusher member effecting corresponding coordinated reciprocating movement of said auxiliary pusher relative to said pusher member through an increment greater than the reciprocating movement of said pusher member in response to movement of said chain around said sprockets.

References Cited by the Examiner
UNITED STATES PATENTS 3,024,794   3/1962   Chill _____ 104—162

EVON C. BLUNK, *Primary Examiner.*

RICHARD E. AEGERTER, *Examiner.*